Figure 1:
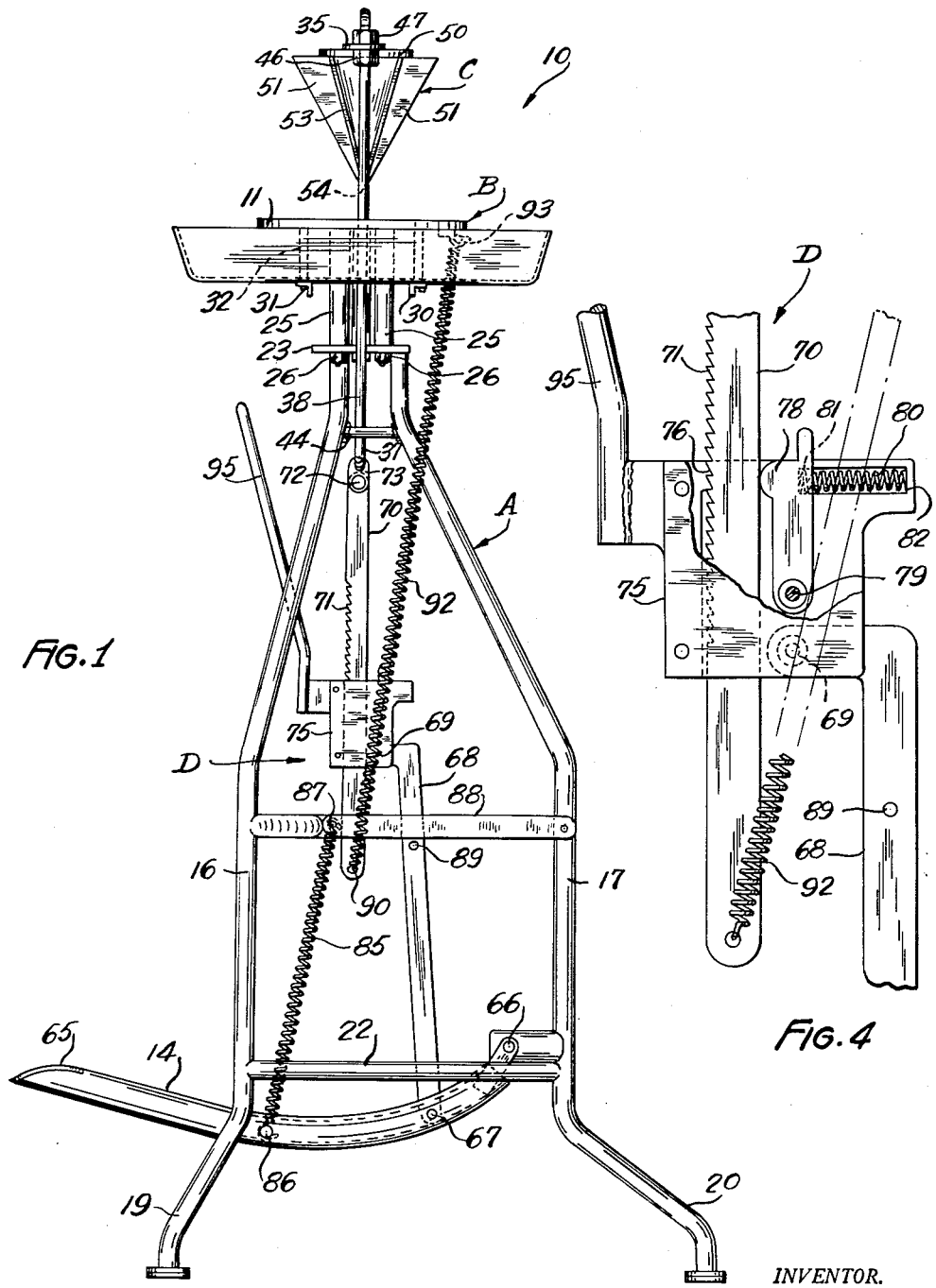

May 15, 1962 F. F. HILLIX 3,034,565
RING EXPANDING MACHINE
Filed Feb. 13, 1959 3 Sheets-Sheet 2

INVENTOR.
FOSTER F. HILLIX
BY Hudson, Boughton,
Williams, David & Hoffmann
ATTORNEYS May 15, 1962  F. F. HILLIX  3,034,565
RING EXPANDING MACHINE
Filed Feb. 13, 1959  3 Sheets-Sheet 3

INVENTOR.
FOSTER F. HILLIX
BY Hudson, Boughton,
Williams, David & Hoffman
ATTORNEYS

United States Patent Office 3,034,565
Patented May 15, 1962

3,034,565
RING EXPANDING MACHINE
Foster F. Hillix, Lakewood, Ohio, assignor to Wedge Protectors, Inc., Cleveland, Ohio, a corporation of Ohio
Filed Feb. 13, 1959, Ser. No. 793,042
5 Claims. (Cl. 153—48)

This invention relates to ring expanding machines, and more particularly, to a machine for expanding split metal rings of very nearly circular form into open or gapped rings of a larger radius.

The expanding machine of this invention is especially suited to expand rings and like articles, including chill rings produced by cold rolling from lengths of relatively thick metal stock. When completed, the ends of the rolled stock are in face-to-face or abutting relationship, and due to the working or rolling of the stock substantial internal stresses are present maintaining that relationship.

The chill rings mentioned just above are used in the practice of joining lengths of pipe by welding, a ring being forced partially into the ends of the pipes to be joined, and there serving to align and space the pipe ends to assure a uniform and accurate weld. It is desirable that such chill rings have a gap or space between the ends of the stock so that a ring may be compressed or flexed slightly, when forced into a pipe end, to thereby assure a snug fit as well as the ability to accommodate minor variations in pipe size and alignment.

It is one object of this invention, therefore, to provide a machine or apparatus which can expand metal rings, by removing some of the curvature thereof, to achieve rings having a larger diameter and containing a small gap or space between the ends of the stock from which the rings are formed.

Another object of this invention is the provision of novel and efficient apparatus for enlarging split metal rings of circular shape and of a variety of initial sizes, and which apparatus is easy to operate and affords a means for producing gapped rings in a rapid and consistent manner.

As another object, this invention aims to provide a machine for expanding rings by removing a portion of the curvature substantially throughout the entire circumference thereof by cold-working the stock of which the rings are formed, to redistribute the internal stresses thereof such that the rings will remain substantially circular and in their expanded condition.

A further object contemplated by this invention resides in the use of a tapered spreading member in the form of a substantially cone-shaped arbor or expander head having a plurality of tapered or diverging blades, the outside edges of which are adapted to engage the inner surface of a ring supported by a surface having an opening therein of a shape adapted to admit the arbor while the ring is restrained, and a force multiplying or compounding lever arrangement which is effective to advance the arbor into the ring, thereby expanding it to such an extent that the ring will assume an enlarged and circular configuration upon the removal of the arbor or expanding head.

As an additional object of this invention there is provided in a ring expanding machine, a novel lever and ratchet arrangement in combination with a tapered or conical arbor for spreading advancement of the latter into a ring; and which permits the expanding of rings of initially different sizes with no change in tooling required, the utility of the device being materially enhanced by such arrangement.

Figure 2:
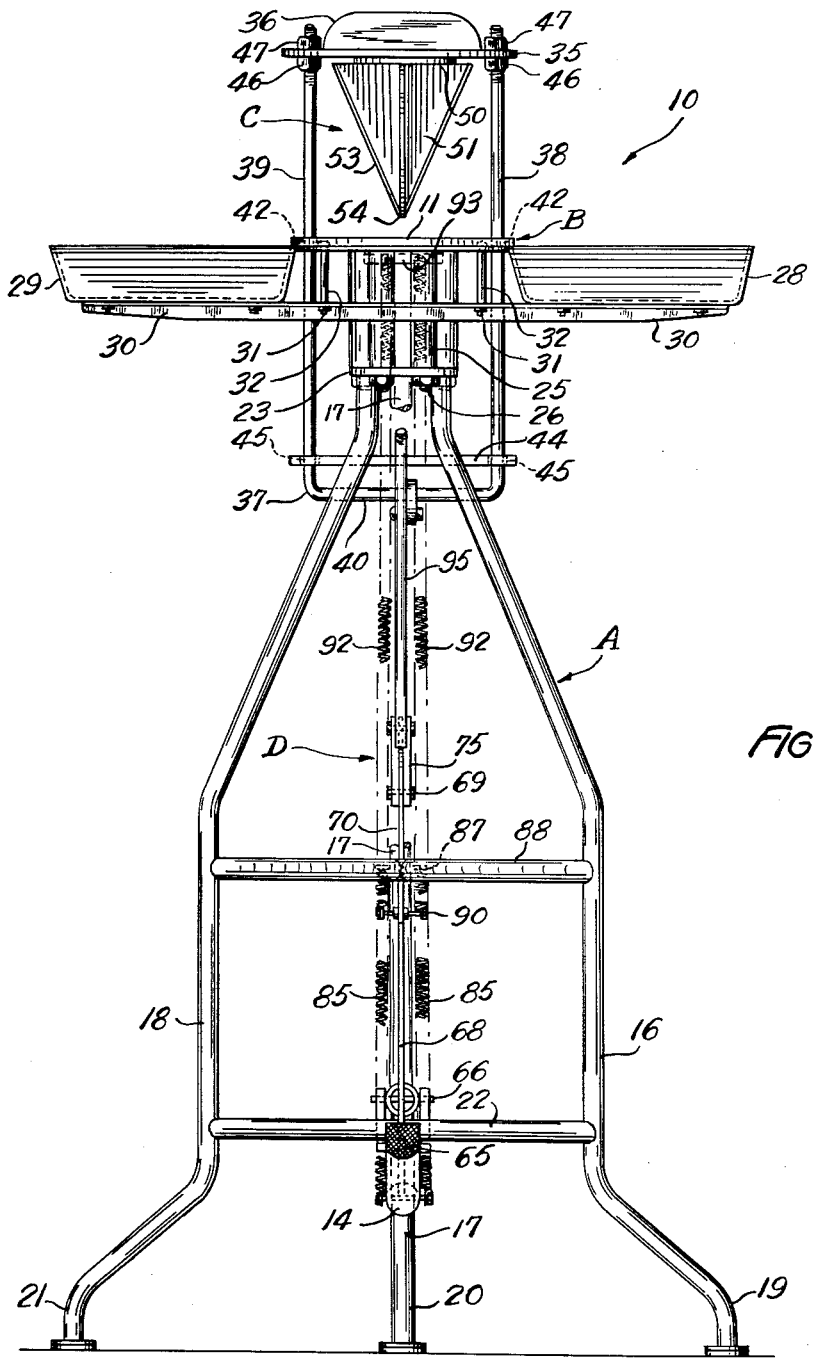
Figure 3:
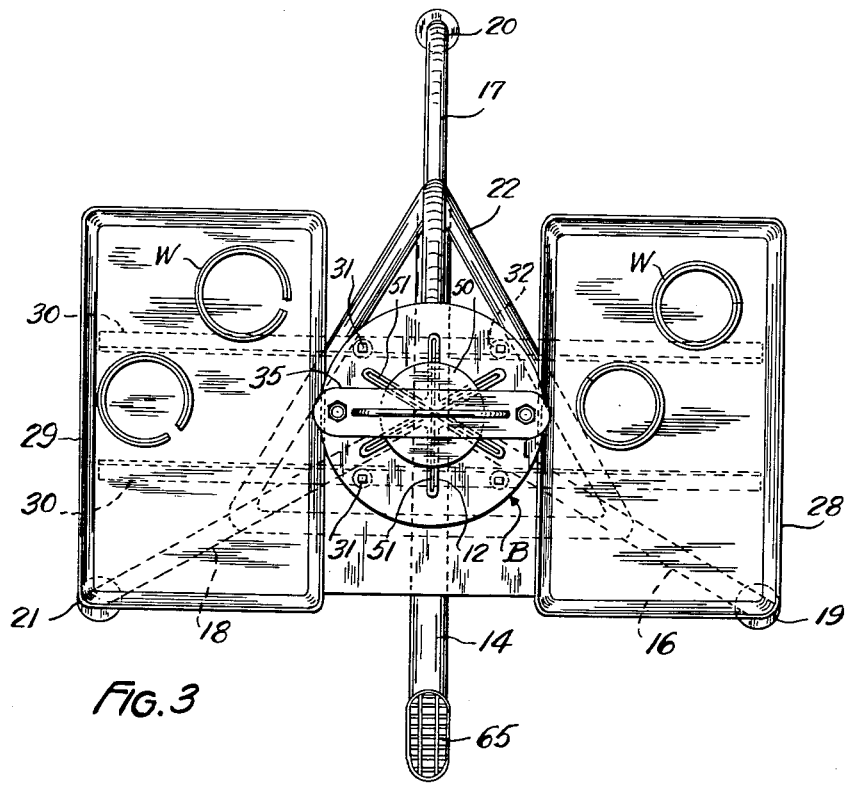
Figure 5:
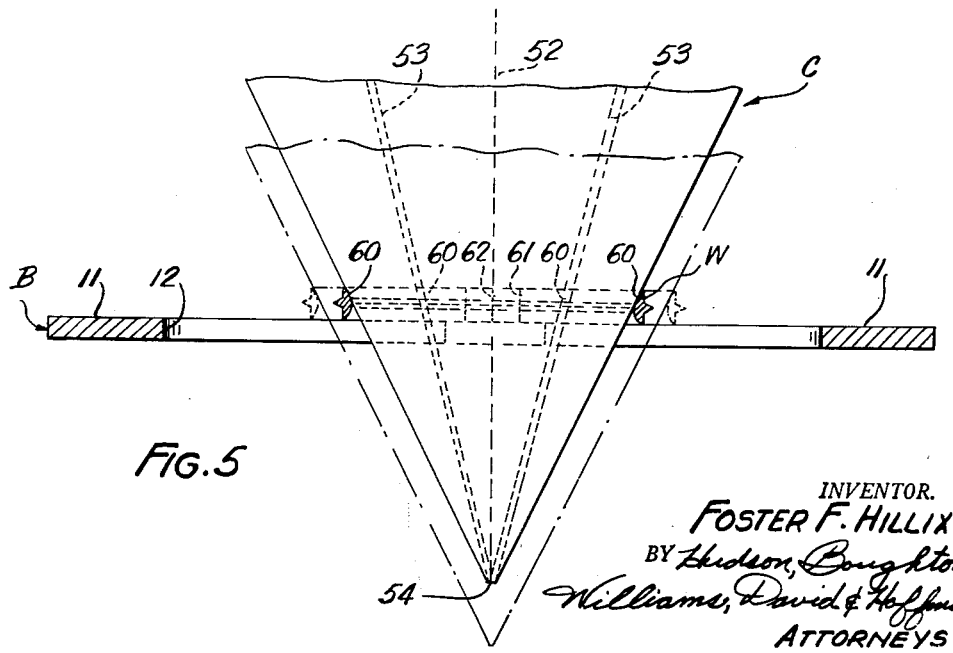

Other objects and advantages will become apparent from the following detailed description of a machine embodying the invention taken in conjunction with the attached sheets of drawings forming a part of this specification and in which:

FIG. 1 is a side elevation of a ring expanding machine embodying this invention;
FIG. 2 is a front elevation of the machine in FIG. 1 as seen from the operator's position;
FIG. 3 is a top plan view of the machine shown in FIG. 1;
FIG. 4 is an elevational view of the ratchet mechanism of the machine shown in FIG. 1, the view being on a larger scale and with portions broken away to show the internal arrangement; and
FIG. 5 is a vertical sectional view of a somewhat diagrammatic form and on a larger scale taken through the work support table.

The ring expanding machine 10, described herein as an embodiment of this invention, has a stand or frame generally designated at A, which is provided with a substantially circular table-like top B presenting a work supporting surface 11. A ring expanding tool in the form of an expander head or arbor is generally indicated at C and is supported for motion toward and away from the table B, and is adapted to be received in a generally star shaped opening 12 formed by radially extending slots in the surface 11 as is illustrated in FIG. 3. The expander head or arbor C is arranged to be advanced by a novel linkage comprising certain parts and arrangements later described in detail, and including an operator's foot lever or treadle 14 and a ratchet means indicated generally at D.

In operation of the machine 10, a workpiece or ring W is placed upon the surface 11 over the opening 12. The expander head or arbor C is then lowered substantially into contact with the ring W and is then forcefully advanced, expanding the ring which is restrained by the surface 11. The arbor C is then moved to a position away from the table B releasing the expanded or processed ring W. The novel manner in which the expanding takes place and the relationship of the various elements of the machine will become apparent as the description now proceeds.

The frame A is conveniently formed of steel tubing and has three legs or uprights 16, 17 and 18 having relatively widespread foot portions 19, 20, and 21 to lend stability thereto. A horizontal triangular brace or former 22 ties the leg portions 16, 17 and 18 into a firm and stable unit. A horizontal plate 23 surmounts the upper ends of the leg portions 16, 17, and 18 and serves as a support for the work-supporting table B, previously mentioned.

The table B is spaced from the horizontal plate 23 by tubular spacer elements 25 and is retained by bolts 26 passing through those elements and through the plate 23. A pan or tray 28 for holding unexpanded workpieces W is positioned at one side of the table B and a similar pan or tray 29 is positioned at the other side thereof for holding finished or gapped rings. The trays 28 and 29 are commonly supported by, and are bolted to, a pair of bars or angle irons 30, which are in turn supported from the table top B by means of bolts and spacers 31 and 32 respectively.

The expander head or arbor C is supported or carried for reciprocating motion toward and away from the table B by a carrier means which is here shown in the form of a crosshead 35 having a reinforcing rib or buttress 36, and which crosshead derives its support from a generally U-shaped yoke member 37 having a pair of upright arms 38 and 39 and a horizontal bottom or connecting portion 40.

The table B is provided near its periphery with diametrically spaced openings 42 which are adapted to slidably receive and guide the arms 38 and 39 of the yoke member 37. The openings 42 and the yoke arms 38, 39 are spaced apart a greater distance than the maximum outside diameter to which the ring W is to be expanded. A transversely extending guide plate 44 spans the frame A below the plate 23 and is provided in its end portions with openings 45 slidably receiving the arms 38 and 39 of the yoke member 37. The openings 45 are in vertical alignment with the openings 42 in the table B and cooperate therewith to guide the yoke member 37 in its reciprocating movement. The crosshead 35 is conveniently secured to the arms 38, 39 of the yoke member 37, for movement therewith, by pairs of cooperating nuts 46 and 47.

The expanding head or arbor C has a circular base element 50 attached to the crosshead 35 and serving as a support for a plurality of intersecting vanes or blades 51. Any practical number of blades 51 may be employed, six being shown in the illustrated embodiment. The blades 51 are generally triangular in shape and extend radially from a common central portion located on axis 52 which is normal to the work surface 11. The narrow surfaces or outer edges 53 of the blades 51 are axially tapered so as to extend in a diverging manner upwardly and outwardly from a common point or vertex 54. The arbor C thereby assumes the shape or appearance of a cone having its vertex or apex 54 pointing towards the surface 11 and spaced slightly therefrom.

The star shaped opening 12 defined in the work supporting surface 11 is, as may best be seen in FIG. 3, of a size and shape calculated to closely admit or receive the arbor C and to prevent rotation thereof in its advancement or lowering to act on a ring W. The edges of the surface 11 defining the star shaped opening 12 lie close to the broad surfaces of the blades 51 when advanced therein, and hence a ring W placed on the table B over the opening will be restrained by the surface 11 when the arbor C is advanced through the ring and in the opening.

The action of the expanded head or arbor C on a ring W when forceably advanced therein is illustrated in FIG. 5, and is in the nature of a progressive and circumferentially distributed spreading or unbending of the ring. In their advancement from the full line to the dotted line position of FIG. 5, the narrow edges 53 of the blades 51 slidably and wedgingly engage and move across the inner surface of a split ring W at spaced points 60 and because of the increasing distance between those points of contact due to the divergence of the edges 53, a circumferential scraping or peening is effected on the inner surface of the ring W by those edges.

The arbor C is advanced in the ring W through the agency of the lever or treadle 14 and the ratchet D and associated linkages described presently, until the ring has been spread open as at 61 or unbent to such an extent beyond the elastic limit thereof that when the arbor is withdrawn the ring will not return to its former completely closed condition as at 62, but will assume a gapped or slightly open position as seen in the pan or tray 29 for finished workpieces W.

The use of an arbor or expander head C, having radially extending blades 51 or the like with narrow edges 53 which act in a scraping or scuffing manner on the inner surface of the rings W, serves to peen or cold work the metal stock of which the rings are made, thereby materially aiding in reducing the skin effect and in redistributing the internal stresses which were imposed on the ring when it was formed by the cold rolling earlier referred to. The scuffing or peening action tends to cause the ring W being enlarged to be wrapped tightly around the expander head C and to be relatively uniformly bent outwardly, or straightened, at a number of places throughout the circumference of the ring. This working or peening of the metal rings allows their enlargement to be effected with a minimum of overbending or exceeding of the elastic limit thereof, and the uniform and substantially circular quality of the rings W is maintained by the bending thereof in a progressive or shifting manner about the circumference of the ring as the points of contact 60 spread out to follow the diverging narrow scraping edges 53.

The previously mentioned force multiplying arrangement for advancing the arbor C into expanding relation with the rings, and the provision for accommodating the expanding machine to rings W of a variety of sizes, involves the lever 14 and the ratchet mechanism D as best illustrated in FIGS. 1 and 4. The operating lever or treadle 14 has a pedal portion 65 at one end and has its other end conveniently pivoted at 66 to the frame A. Between the pivot 66 and the pedal 65 of the lever 14 there is pivotally connected at 67 a connecting link or pull rod 68. The pull rod 68 has an L-shaped upper end and is pivotally connected to the ratchet mechanism D as at 69.

A toothed link or rack 70, having a series of ratchet teeth 71, is pivotally connected at 72 to an eye 73 secured on the bottom portion 40 of the yoke member 37. The rack 70 forms a part of the ratchet mechanism D and is slidably received within a body member or housing 75 of the ratchet.

Within the ratchet housing 75 is a set of ratchet teeth 76 which are complementary to and adapted to engage with the teeth 71 of the rack 70. A spring biased latch or lever 78 is pivoted at 79 and bears against the rack 70 urging the teeth 71 thereof to engage in a cooperating manner with the ratchet teeth 76. A compression spring 80 has one end seated in a socket 81 in the latch 78 and its other end seated in a socket 82 formed in the housing 75 and tends to rotate the latch 78 about its pivot 79 to achieve the engagement of the teeth 71 and 76.

A pair of tension springs 85 are connected to the lever 14 at 86, and are also connected at 87 to a cross member 88 forming a part of the frame A. The lever 14, the pull rod 68 and the ratchet housing 75 are raised or biased by the springs 85 into their uppermost or rest positions as limited by a stop pin means 89 which is adapted to abut the frame member 88.

Connected to a pin 90 at the lower end of the rack 70 is a pair of tension springs 92 having connection also to a hook 93 depending from the table B. The springs 92 serve to move or bias the rack 70, yoke member 37 and arbor C into their uppermost positons, as permitted by the position of the ratchet housing 75 and the position of the rack 70 in the housing.

A ratchet release lever 95 is rigidly secured to the ratchet housing 75 and extends away therefrom in a position convenient to the grasp of the machine operator. It will be observed that the cooperating teeth 71 and 76 are shaped to permit the rack 70 to be forced downwardly through the housing 75, the teeth 71 riding over the teeth 76 against the biasing action of the latch 78. Upward movement of the rack 70 through the housing 75 is prevented, however, the teeth 71 and 76 being maintained in engagement by the latch 78. Movement of the ratchet release lever 95 in a manner rotating the housing 75 in a counterclockwise direction as seen in FIGS. 1 and 4, will withdraw the teeth 76 from their holding engagement with the teeth 71 of the rack. The latter will rise under the influence of the springs 92 lifting the yoke member 37 and the arbor C to their uppermost positions with the apex 54 of the arbor spaced somewhat from the table surface 11.

In carrying out the expanding of a ring W on the machine embodying this invention, the operator first places a ring of any diameter capable of being spread by the arbor C on the surface 11 and over the opening 12. The arbor C is then manually pressed down or advanced until the edges 53 of the blades 51 engage, or are about to engage, the inner surface of the ring W. This procedure drives the rack 70 downwardly through the ratchet housing 75 where it is retained and thereby effectively shortens the linkage or connection between the lever 14 and the yoke member 37 with the arbor C. It should be noted here that the springs 85 provide sufficient tension on the lever 14 to prevent the ratchet housing 75 from being lowered under the influence of the rack 70 being forced therethrough during the manual lowering of the arbor C into its ring engaging position.

The operator then steps on and depresses the pedal 65 of the lever 14, and because of the mechanical advantage realized at the pivot point 67, the arbor C is drawn down or advanced with sufficient force to bend or expand the ring W outwardly beyond its elastic limit, while the inner surface thereof is peened and scuffed by the blades 51. Upon release of the lever or treadle 14 the same will rise together with the ratchet mechanism D and the arbor C under the influence of the pairs of springs 85 and 92, leaving the ring W in a somewhat expanded or gapped condition.

The angle of divergence of the blade edges 53 is great enough so that the residual elastic tendency of the ring W to contract will cause it to free itself from the arbor C as the arbor rises.

Since the ratchet mechanism D retains the arbor C in a somewhat advanced position after the pedal 65 is released, the expanded ring W cannot be removed from the machine until the ratchet is tripped to let the rack 70 and the arbor rise under the influence of the springs 92 to their uppermost positions. This is accomplished through the agency of the ratchet release lever 95 previously described. The gapped ring W may then be removed to the tray or pan 29 leaving the machine ready to act on another ring of the same or of a different size.

From the foregoing detailed description of the parts and their arrangement in the expanding machine of this invention, it will be appreciated that the objects and advantages set out above, as well as others, have been met in a manner well suited to the rapid and efficient production of gapped or expanded rings, and that the machine herein described is rugged though simple in its construction and can be operated over long periods of time with a minimum of maintenance and repair.

Although the ring expanding machine of this invention has been described in a rather detailed manner and with reference to a specific embodiment thereof, it is understood that the invention is not to be limited thereby, but includes those changes and modifications as are embraced in the scope of the following claims.

Having described my invention, I claim:

1. In a ring expanding machine; plate means providing a flat work support surface; frame means connected with said plate means and located on one side thereof; said plate means having an opening therein comprising an annular group of slots disposed in a radiating relation to a central axis extending normal to said support; said plate means being adapted to receive thereagainst and support a work ring in an overlying relation to said slots and surrounding said axis; said slots being of a length so that the outer ends thereof lie outside of the initial inner diameter of said work ring; carrier means spaced from said plate means and located on the other side thereof; said carrier means being movable through a work stroke in a direction toward said plate means; an arbor on said carrier means and movable thereby into said ring to expand the same; actuting means on said frame means; and motion transmitting means connected between said actuating means and carrier means and extending past said plate means transverse to said support surface and outwardly of the maximum diameter to which said ring is to be expanded; said arbor comprising a central portion located substantially on said axis, and an annular group of blades connected with said central portion and disposed in a radiating relation similar to that of said slots and being movable into the latter; said blades having axial edge portions inclined in a tapering relation to said axis and wedgingly slidable against and across the inner periphery of said ring for applying expanding thrust thereto.

2. A ring expanding machine as defined in claim 1 wherein said motion transmitting means comprises yoke means having arms connected with said carrier means on opposite sides of said arbor and extending past said plate means at points located on opposite sides of said opening.

3. A ring expanding machine as defined in claim 1 wherein said plate means is disposed in a generally horizontal position for a gravity deposition of said work ring on said support surface; and wherein said frame means is in an upright position beneath, and supports, said plate means.

4. A ring expanding machine as defined in claim 1 wherein said actuating means includes spring means effective to produce a return movement to said arbor for retracting the same from said opening and work ring.

5. In a ring expanding machine; plate means providing a flat work support surface; frame means connected with said plate means and located on one side thereof; said plate means having an opening therein comprising an annular group of slots disposed in a radiating relation to a central axis extending normal to said support surface; said plate means being adapted to receive thereagainst and support a work ring in an overlying relation to said slots and surrounding said axis; said slots being of a length so that the outer ends thereof lie outside of the initial inner diameter of said work ring; carrier means spaced from said plate means and located on the other side thereof; said carrier means being movable through a work stroke in a direction toward said plate means; an arbor on said carrier means and movable thereby into said ring to expand the same; said arbor comprising a central portion located substantially on said axis, and an annular group of blades connected with said central portion and disposed in a radiating relation similar to that of said slots and being movable into the latter; said blades having axial edge portions inclined in a tapering relation to said axis and wedgingly sidable against and across the inner periphery of said ring for applying expanding thrust thereto; yoke means having arms connected with said carrier means and extending past said plate means transversely to said support surface at points located outwardly of the maximum diameter to which said ring is to be expanded; a ratchet housing having a passage therethrough; link means connected with said yoke means and having a portion extending through said housing; ratchet means co-operably effective between said housing and the link portion extending therethrough for releasably connecting the housing with said link means; spring means effective for normally retaining said arbor in a position retracted from said opening; actuating means movably operable on said frame means and connected with said housing for moving the same in a direction to apply a pulling force to said link means for moving said arbor into said opening and ring in opposition to said spring means; and ratchet release means projecting from said housing and actuatable to release said ratchet means.

References Cited in the file of this patent

UNITED STATES PATENTS

| | | |
|---|---|---|
| 1,038,044 | Wessell | Sept. 10, 1912 |
| 1,671,697 | Burke | May 29, 1928 |
| 1,836,112 | Ganster | Dec. 15, 1931 |
| 2,707,511 | Franck | May 3, 1955 |

FOREIGN PATENTS

| | | |
|---|---|---|
| 27,569 | Great Britain | Dec. 31, 1898 |
| 372,265 | Great Britain | Mar. 1, 1930 |
| 437,382 | Italy | July 10, 1948 |